US011522671B2

United States Patent
Hiromasa

(10) Patent No.: US 11,522,671 B2
(45) Date of Patent: Dec. 6, 2022

(54) HOMOMORPHIC INFERENCE DEVICE, HOMOMORPHIC INFERENCE METHOD, COMPUTER READABLE MEDIUM, AND PRIVACY-PRESERVING INFORMATION PROCESSING SYSTEM

(71) Applicant: Mitsubishi Electric Corporation, Tokyo (JP)

(72) Inventor: Ryo Hiromasa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 16/652,850

(22) PCT Filed: Nov. 27, 2017

(86) PCT No.: PCT/JP2017/042463
§ 371 (c)(1),
(2) Date: Apr. 1, 2020

(87) PCT Pub. No.: WO2019/102624
PCT Pub. Date: May 31, 2019

(65) Prior Publication Data
US 2020/0235908 A1 Jul. 23, 2020

(51) Int. Cl.
*H04L 9/00* (2022.01)
*H04L 9/06* (2006.01)
(Continued)

(52) U.S. Cl.
CPC .............. *H04L 9/008* (2013.01); *G06N 5/04* (2013.01); *H04L 9/0618* (2013.01)

(58) Field of Classification Search
CPC ..... H04L 9/008; H04L 9/0618; H04L 9/3093; G06F 21/60; G06F 21/71; G06N 3/0481; G06N 5/04
See application file for complete search history.

(56) References Cited

U.S. PATENT DOCUMENTS

| 5,253,330 A | 10/1993 | Ramacher et al. |
| 5,796,925 A | 8/1998 | Deville |

(Continued)

FOREIGN PATENT DOCUMENTS

| JP | 2-58157 A | 2/1990 |
| JP | 5-242068 A | 9/1993 |

(Continued)

OTHER PUBLICATIONS

Crypto-Nets: Neural Networks Over Encrypted Data, by Xie et al, (Year: 2015).*

(Continued)

*Primary Examiner* — Vu V Tran
(74) *Attorney, Agent, or Firm* — Birch, Stewart, Kolasch & Birch, LLP

(57) ABSTRACT

A range determination unit (412) takes as input an input ciphertext $C_i$ resulting from encrypting input data, determines whether a value obtained from the input data is within a reference range, and generates a range ciphertext $a_j$ depending on a determined result. A result generation unit (413) performs a homomorphic operation on the range ciphertext $a_j$ generated by the range determination unit (412), so as to generate a result ciphertext D of a result of performing inference including a non-polynomial operation on the input data. An output unit (414) outputs the result ciphertext D.

8 Claims, 16 Drawing Sheets

(51) Int. Cl.
*H04L 9/30* (2006.01)
*G06F 21/60* (2013.01)
*G06F 21/71* (2013.01)
*G06N 3/04* (2006.01)
*G06N 5/04* (2006.01)

(56) References Cited

U.S. PATENT DOCUMENTS

| | | |
|---|---|---|
| 2012/0054485 A1 | 3/2012 | Tanaka et al. |
| 2012/0254605 A1 | 10/2012 | Sun et al. |
| 2012/0254606 A1 | 10/2012 | Sun et al. |
| 2015/0381349 A1 | 12/2015 | Nikolaenko et al. |
| 2016/0020898 A1 | 1/2016 | Nikolaenko et al. |
| 2016/0036584 A1 | 2/2016 | Nikolaenko et al. |
| 2016/0350648 A1* | 12/2016 | Gilad-Bachrach ... G06N 3/0481 |
| 2017/0039487 A1 | 2/2017 | Naganuma et al. |
| 2018/0053085 A1 | 2/2018 | Matsumoto et al. |
| 2018/0096248 A1* | 4/2018 | Chabanne ............... H04L 9/008 |
| 2019/0138899 A1* | 5/2019 | Hoshizuki ............ G06N 3/0454 |

FOREIGN PATENT DOCUMENTS

| | | |
|---|---|---|
| JP | 7-282038 A | 10/1995 |
| JP | 2001-527728 A | 12/2001 |
| JP | 2002-278585 A | 9/2002 |
| JP | 2012-49679 A | 3/2012 |
| JP | 2012-69076 A | 4/2012 |
| JP | 2013-239118 A | 11/2013 |
| JP | 2014-503833 A | 2/2014 |
| JP | 2016-510908 A | 4/2016 |
| JP | 2016-218513 A | 12/2016 |
| WO | WO 99/45670 A2 | 9/1999 |
| WO | WO 2015/155896 A1 | 10/2015 |
| WO | WO 2016/194248 A1 | 12/2016 |

OTHER PUBLICATIONS

Chabanne et al, "Privacy-Preserving Classification on Deep Neural Network", Cryptology ePrint Archive, Real World Cryptography 2017, Jan. 13, 2017, 19 pages.

Chilloti et al., "Faster Fully Homomorghic Encryption: Bootstrapping in less than 0.1 Seconds", Cryptology ePrint Archive: Report 2016/870, IACR-ASIACRYPT-2016, Sep. 6, 2016, 32 pages.

Chillotti et al., "Improving TFHE: faster packed homomorphic operations and efficient circuit bootstrapping", Cryptology ePrint Archive: Report 2017/430, May 18, 2017, pp. 1-39 (40 pages).

Dowlin et al., "CryptoNets: Applying Neural Networks to Encrypted Date with High Throughput and Accuracy", ICML '16: Proceedings of the 33rd International Conference on International Conference on Machine Learning, Jun. 2016, vol. 48, pp. 201-210 (13 pages).

International Search Report, dated Feb. 27, 2018, for International Application No. PCT/JP2017/042463, with an English translation.

Orlandi et al., "Oblivious Neural Network Computing via Homomorphic Encryption", EURASIP Journal on Information Security, vol. 2007, pp. 1-11 (11 pages).

\* cited by examiner

HOMOMORPHIC INFERENCE DEVICE, HOMOMORPHIC INFERENCE METHOD, COMPUTER READABLE MEDIUM, AND PRIVACY-PRESERVING INFORMATION PROCESSING SYSTEM

TECHNICAL FIELD

The present invention relates to a technique for performing inference while data remains encrypted.

BACKGROUND ART

Homomorphic encryption is a cryptographic technology that allows data to be operated on while the data remains encrypted. In recent years, the use of cloud services is spreading. Due to concerns about cracking and the reliability of a cloud, it is conceivable that encrypted data is stored on the cloud. Homomorphic encryption is a technology that allows an operation to be performed on encrypted data without decrypting the data, thereby allowing the use of cloud services without compromising security.

Neural networks are a technology that is useful for image and video recognition. A neural network is composed of three types of layers each performing a specific process: an input layer, an intermediate layer, and an output layer. At the input layer, data is input. At the intermediate layer, a certain computation is performed on the input data and a computation result of the intermediate layer. At the output layer, a computation result of the intermediate layer is output.

Neural networks that achieve high inference accuracy, which have been actively studied in recent years, have a very large number of intermediate layers, and the inference process therein involves a vast amount of computation. It is difficult for a terminal with low computational power to perform the inference process using such a neural network. It is therefore conceivable that the inference process is outsourced to a cloud with high computational power. When the input data to the neural network is private data such as surveillance camera video, the inference process of the neural network needs to be performed while protecting the privacy of the input data from the cloud. By using homomorphic encryption to perform the inference process using the neural network while the input data remains encrypted, the inference process can be outsourced to the cloud while maintaining the privacy.

Performing complex computations using homomorphic encryption while data remains encrypted involves a vast amount of computation. Therefore, in order to perform the inference process using the neural network while data remains encrypted, it is conceivable that the intermediate layers of the neural network are replaced with intermediate layers that perform simple computations.

Examples of using homomorphic encryption to perform the inference process using the neural network while data remains encrypted are described in Non-Patent Literature 1 and Non-Patent Literature 2. In Non-Patent Literature 1, the inference process while data remains encrypted is realized by configuring a shallow neural network with only intermediate layers that perform simple computations. In Non-Patent Literature 2, functions to be computed at intermediate layers of a deep neural network are replaced with simple approximate functions, so as to replace computations at the intermediate layers with simple computations.

CITATION LIST

Non-Patent Literature

Non-Patent Literature 1: N. Dowlin, R. Gilad-Bachrach, K. Laine, K. Lauter, M. Naehrig, J. Wernsig. "Crypt® Nets: Applying Neural Networks to Encrypted Data with High Throughput and Accuracy". In ICML, pages 201-210, 2016. Also available at https://www.microsoft.com/en-us/research/wp-content/uploads/2016/04/CryptonetsTech Report.pdf Non-Patent Literature 2: H. Chabanne, A. de Wargny, J. Milgram, C. Morel, E. Prouff. Privacy-Preserving Classification on Deep Neural Network. In Real World Crypto 2017. Also available at https://eprint.iacr.org/2017/035.pdf.

Non-Patent Literature 3: Ilaria Chilloti, Nicolas Gama, Mariya Georgieva, and Malika Izabach`ene. Improving TFHE faster packed homomorphic operations and efficient circuit bootstrapping. Cryptology ePrint Archive, Report 2017/430, 2017. Available at http://eprint.iacr.org/2017/430.

SUMMARY OF INVENTION

Technical Problem

In Non-Patent Literature 2, the functions to be computed at the intermediate layers are replaced with the simple functions. However, computations are performed differently from those in the neural network before the functions are replaced, so that inference errors between encrypted data and non-encrypted data cannot be avoided. Therefore, even if the neural network can achieve high inference accuracy on non-encrypted data, the neural network cannot always achieve high inference accuracy on encrypted data. That is, even if there is a neural network that can achieve high recognition accuracy on non-encrypted data, a neural network needs to be newly configured for encrypted data.

It is an object of the present invention to allow inference including a non-polynomial operation, such as a function at an intermediate layer, to be computed without performing replacement with an approximate function.

Solution to Problem

A homomorphic inference device according to the present invention includes a range determination unit to take as input an input ciphertext resulting from encrypting input data, determine whether a value obtained from the input data is within a reference range, and generate a range ciphertext depending on a determined result; and a result generation unit to perform a homomorphic operation on the range ciphertext generated by the range determination unit, so as to generate a result ciphertext of a result of performing inference including a non-polynomial operation on the input data.

Advantageous Effects of Invention

In the present invention, it is determined whether a value obtained from input data is within a reference range, using as input an input ciphertext, and a range ciphertext depending on a determined result is generated. Then, a homomorphic operation is performed on the range ciphertext, so as to generate a result ciphertext of a result of performing inference. This allows inference including a non-polynomial operation to be performed without performing replacement with an approximate function.

DESCRIPTION OF EMBODIMENTS

First Embodiment

*Description of Configuration*

Figure 1:
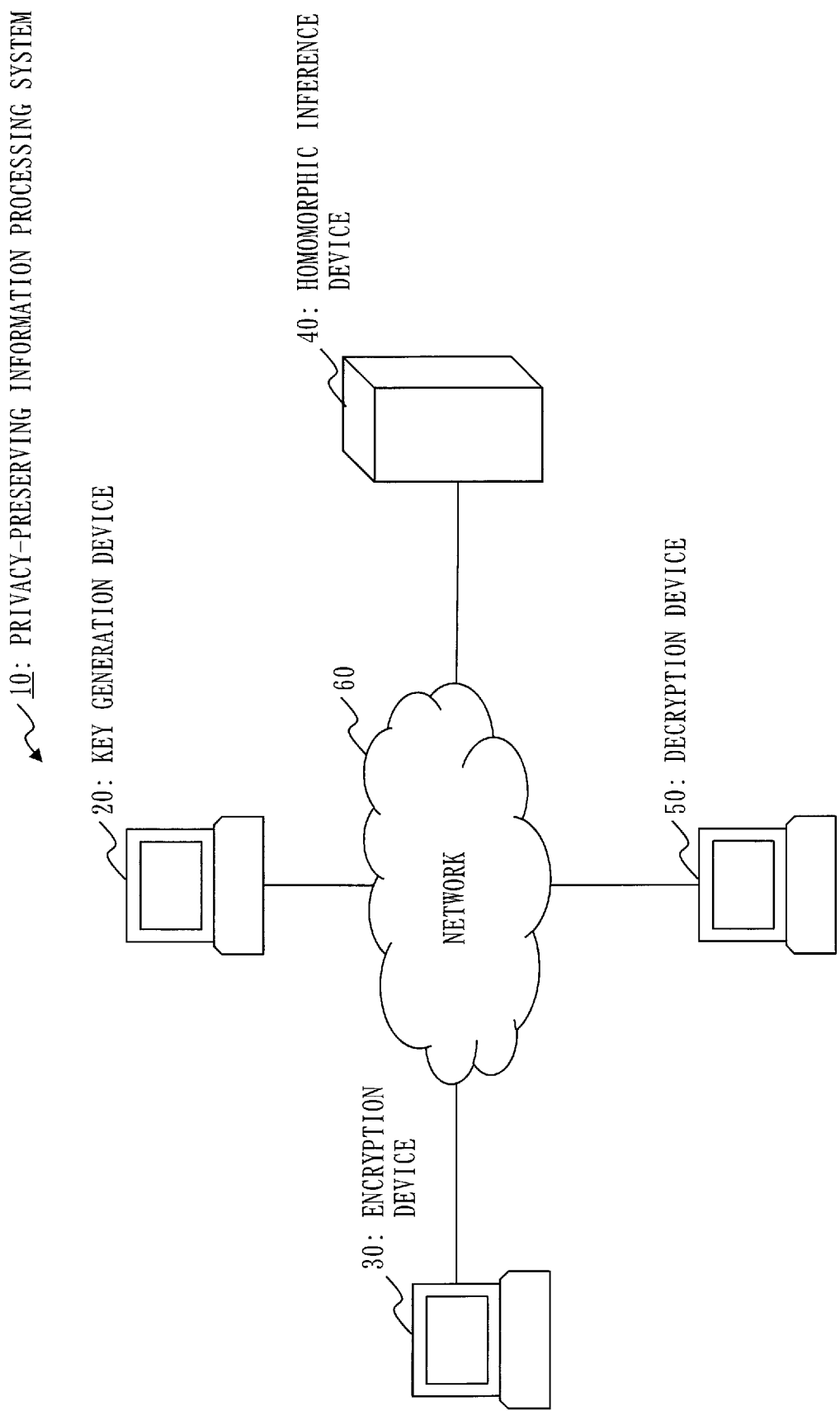
FIG. 1 is a configuration diagram of a privacy-preserving information processing system 10 according to a first embodiment.

A configuration of a privacy-preserving information processing system 10 according to a first embodiment will be described with reference to FIG. 1.

The privacy-preserving information processing system 10 includes a key generation device 20, an encryption device 30, a homomorphic inference device 40, and a decryption device 50.

The key generation device 20, the encryption device 30, the homomorphic inference device 40, and the decryption device 50 are connected via a network 60. A specific example of the network 60 is the Internet. The network 60 may be a different type of network such as a local area network (LAN).

A configuration of the key generation device 20 according to the first embodiment will be described with reference to FIG. 2.

The key generation device 20 is a computer such as a personal computer (PC).

The key generation device 20 includes hardware of a processor 21, a memory 22, a storage 23, and a communication interface 24. The processor 21 is connected with the other hardware components and controls these other hardware components.

The key generation device 20 includes, as functional components, an acquisition unit 211, a key generation unit 212, and an output unit 213. The functions of the functional components of the key generation device 20 are realized by software.

The storage 23 stores programs for realizing the functions of the functional components of the key generation device 20. These programs are loaded into the memory 22 by the processor 21 and executed by the processor 21. This realizes the functions of the functional components of the key generation device 20.

The storage 23 realizes the function of a key storage unit 231.

Figure 3:
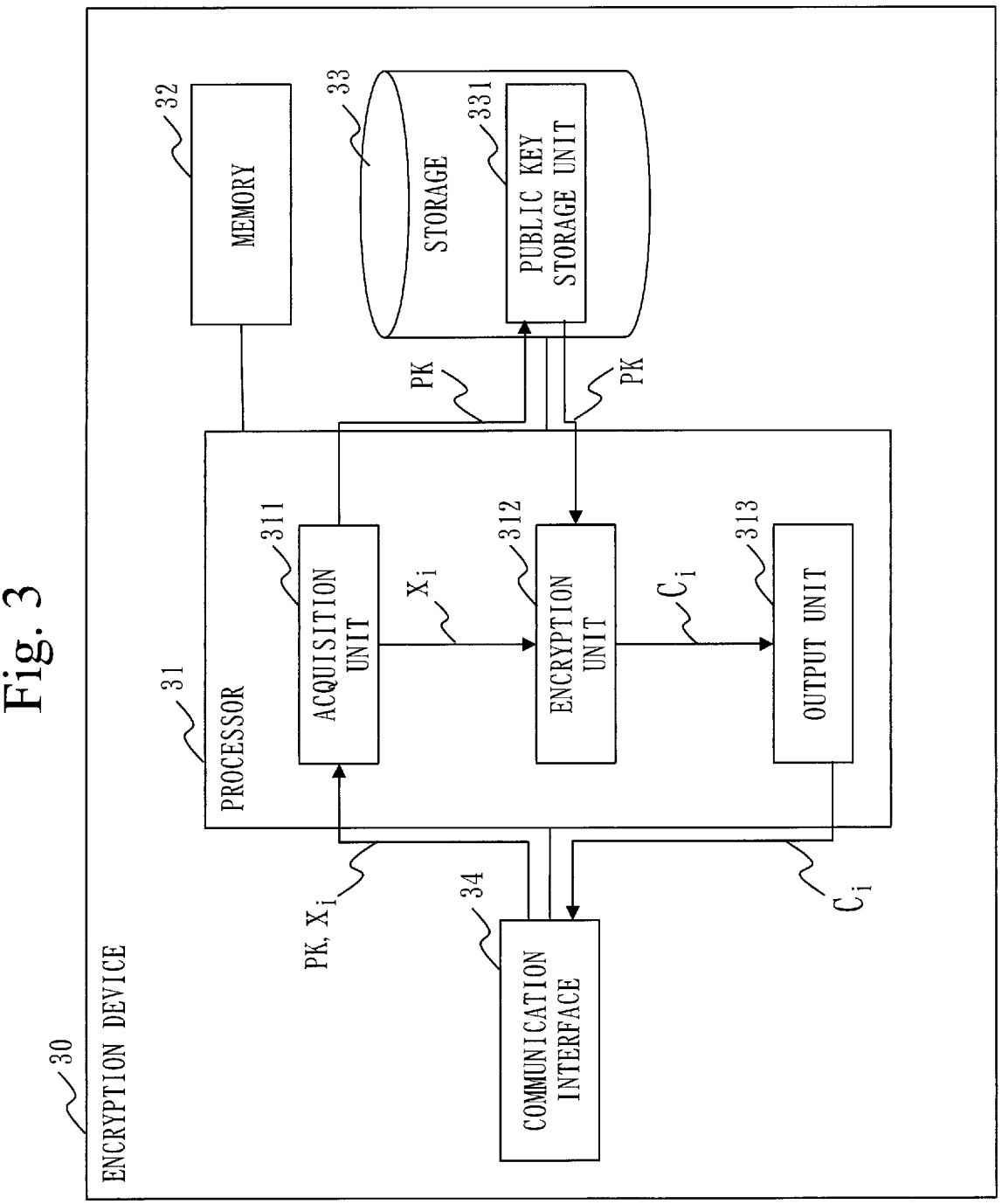
FIG. 3 is a configuration diagram of an encryption device 30 according to the first embodiment.

A configuration of the encryption device 30 according to the first embodiment will be described with reference to FIG. 3.

The encryption device 30 is a computer such as a PC.

The encryption device 30 includes hardware of a processor 31, a memory 32, a storage 33, and a communication interface 34. The processor 31 is connected with the other hardware components via signal lines and controls these other hardware components.

The encryption device 30 includes, as functional components, an acquisition unit 311, an encryption unit 312, and an output unit 313. The functions of the functional components of the encryption device 30 are realized by software.

The storage 33 stores programs for realizing the functions of the functional components of the encryption device 30. These programs are loaded into the memory 32 by the processor 31 and executed by the processor 31. This realizes the functions of the functional components of the encryption device 30.

The storage 33 realizes the function of a public key storage unit 331.

Figure 4:
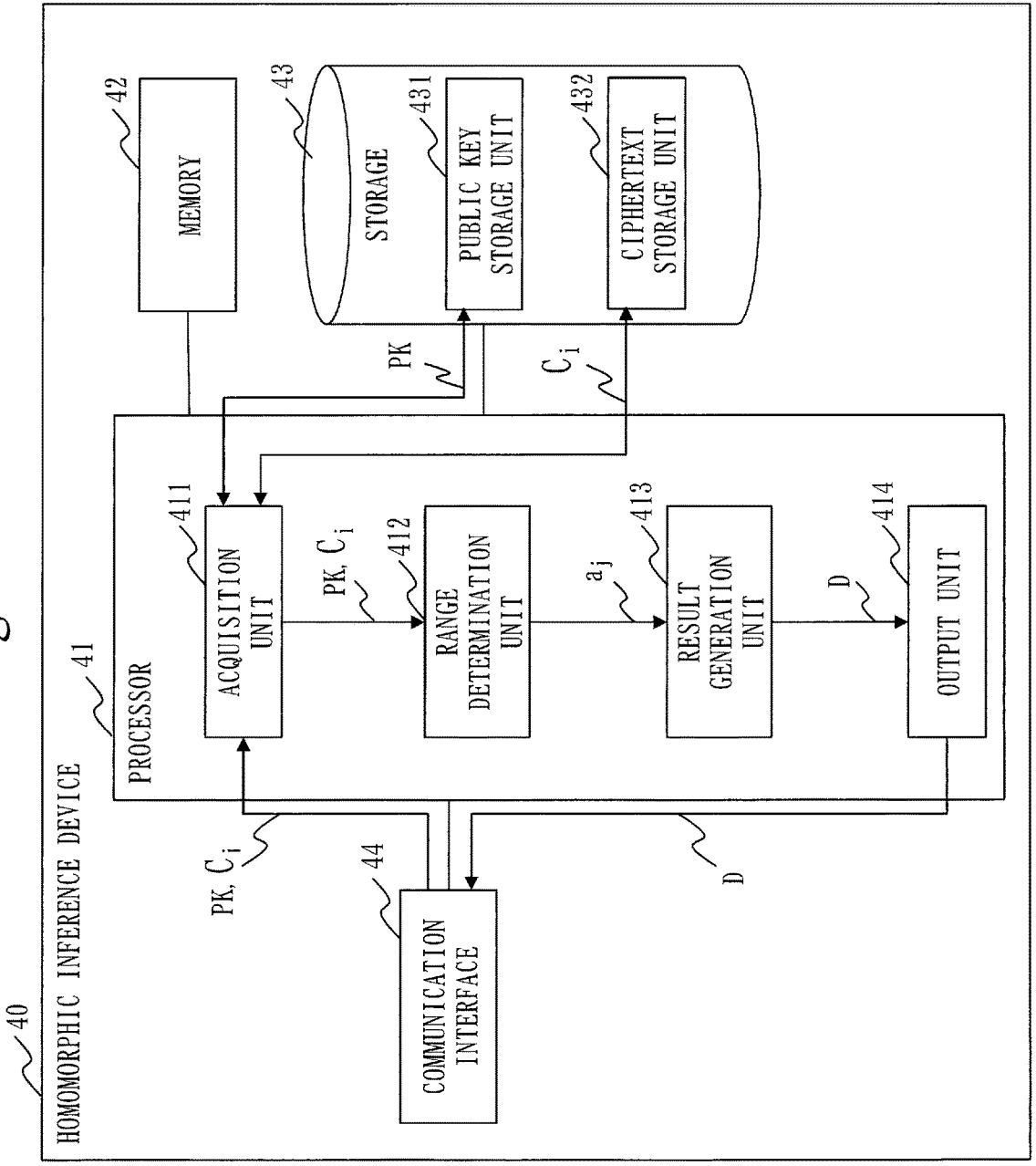
FIG. 4 is a configuration diagram of a homomorphic inference device 40 according to the first embodiment.

A configuration of the homomorphic inference device 40 according to the first embodiment will be described with reference to FIG. 4.

The homomorphic inference device 40 is a computer, such as a server, that has a large-capacity storage device.

The homomorphic inference device 40 includes hardware of a processor 41, a memory 42, a storage 43, and a communication interface 44. The processor 41 is connected with the other hardware components via signal lines and controls these other hardware components.

The homomorphic inference device 40 includes, as functional components, an acquisition unit 411, a range determination unit 412, a result generation unit 413, and an output unit 414. The functions of the functional components of the homomorphic inference device 40 are realized by software.

The storage 43 stores programs for realizing the functions of the functional components of the homomorphic inference device 40. These programs are loaded into the memory 42 by the processor 41 and executed by the processor 41. This realizes the functions of the functional components of the homomorphic inference device 40.

The storage 43 realizes the functions of a public key storage unit 431 and a ciphertext storage unit 432.

Figure 5:
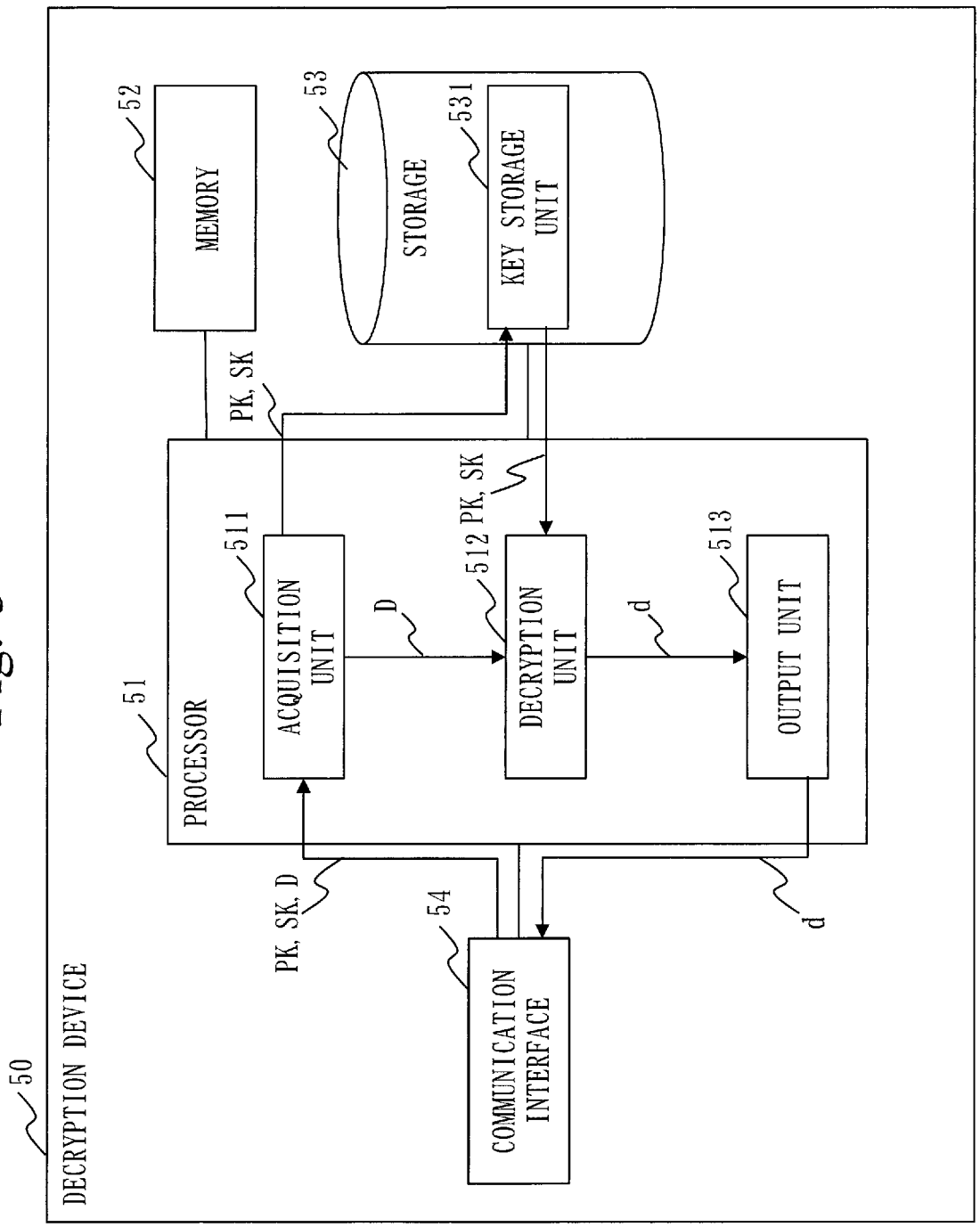
FIG. 5 is a configuration diagram of a decryption device 50 according to the first embodiment.

A configuration of the decryption device 50 according to the first embodiment will be described with reference to FIG. 5.

The decryption device 50 is a computer such as a PC.

The decryption device 50 includes hardware of a processor 51, a memory 52, a storage 53, and a communication interface 54. The processor 51 is connected with the other hardware components via signal lines and controls these other hardware components.

The decryption device 50 includes, as functional components, an acquisition unit 511, a decryption unit 512, and an output unit 513. The functions of the functional components of the decryption device 50 are realized by software.

The storage 53 stores programs for realizing the functions of the functional components of the decryption device 50. These programs are loaded into the memory 52 by the processor 51 and executed by the processor 51. This realizes the functions of the functional components of the decryption device 50.

The storage 53 realizes the function of a key storage unit 531.

Each of the processors 21, 31, 41, and 51 is an integrated circuit (IC) that performs arithmetic processing. As a specific example, each of the processors 21, 31, 41, and 51 is a central processing unit (CPU), a digital signal processor (DSP), or a graphics processing unit (GPU).

Each of the memories 22, 32, 42, and 52 is a storage device to temporarily store data. As a specific example, each of the memories 22, 32, 42, and 52 is a static random access memory (SRAM) or a dynamic random access memory (DRAM).

Each of the storages 23, 33, 43, and 53 is a storage device to store data. As a specific example, each of the storages 23, 33, 43, and 53 is a hard disk drive (HDD). Each of the storages 23, 33, 43, and 53 may be a portable storage medium such as a Secure Digital (SD, registered trademark) memory card, CompactFlash (CF), a NAND flash, a flexible disk, an optical disc, a compact disc, a Blu-ray (registered trademark) disc, or a digital versatile disc (DVD).

Each of the communication interfaces 24, 34, 44, and 54 is an interface for communicating with external devices. As a specific example, each of the communication interfaces 24, 34, 44, and 54 is an Ethernet (registered trademark) port, a Universal Serial Bus (USB) port, or a High-Definition Multimedia Interface (HDMI, registered trademark) port.

Figure 2:
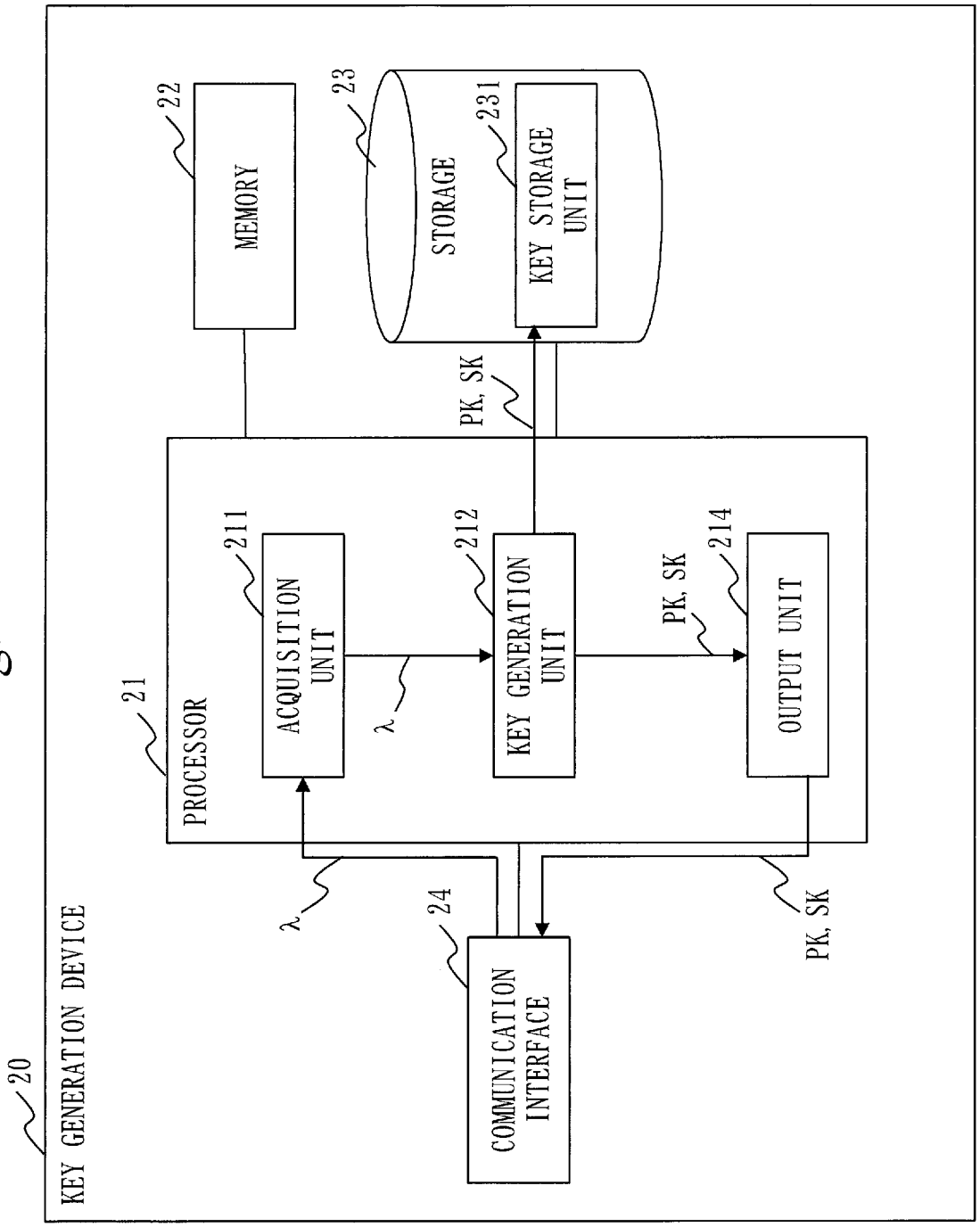
FIG. 2 is a configuration diagram of a key generation device 20 according to the first embodiment.

FIG. 2 illustrates only one processor 21. However, the key generation device 20 may include a plurality of processors as an alternative to the processor 21. Similarly, the encryption device 30 may include a plurality of processors as an alternative to the processor 31, the homomorphic inference device 40 may include a plurality of processors as an alternative to the processor 41, and the decryption device 50 may include a plurality of processors as an alternative to the processor 51. The plurality of processors share the execution of the programs for realizing the functions of the functional components. Each of the plurality of processors is, like the processors 21, 31, 41, and 51, an IC that performs arithmetic processing.

\*\*\*Description of Operation\*\*\*

Operation of the privacy-preserving information processing system 10 according to the first embodiment will be described with reference to FIGS. 6 to 12.

The operation of the privacy-preserving information processing system 10 according to the first embodiment corresponds to a privacy-preserving information processing method according to the first embodiment. The operation of the privacy-preserving information processing system 10 according to the first embodiment also corresponds to processes of a privacy-preserving information processing program according to the first embodiment.

Figure 6:
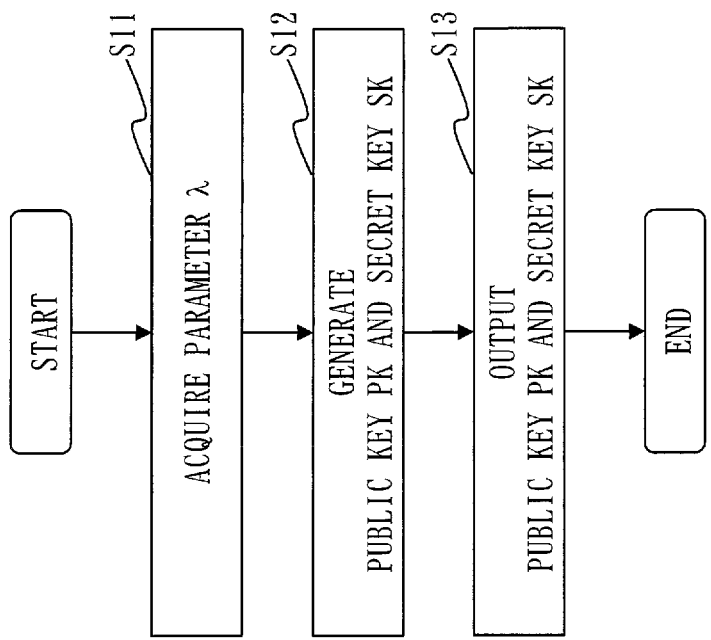
FIG. 6 is a flowchart of operation of the key generation device 20 according to the first embodiment.

Operation of the key generation device 20 according to the first embodiment will be described with reference to FIG. 6.

The operation of the key generation device 20 according to the first embodiment corresponds to a key generation method according to the first embodiment. The operation of the key generation device 20 according to the first embodiment also corresponds to processes of a key generation program according to the first embodiment.

(Step S11: Acquisition Process)

The acquisition unit 211 acquires a parameter $\lambda$ via the communication interface 24. The acquisition unit 211 writes the acquired parameter $\lambda$ in the memory 22.

(Step S12: Key Generation Process)

The key generation unit 212 reads the parameter $\lambda$ written in step S11 from the memory 22. The key generation unit 212 generates a public key PK and a secret key SK, taking as input the parameter $\lambda$. The key generation unit 212 writes the generated public key PK and secret key SK in the key storage unit 231.

It is assumed here that the key generation unit 212 generates the public key PK and the secret key SK of an RGSW encryption scheme. The RGSW encryption scheme is described in Non-Patent Literature 3.

(Step S13: Output Process)

The output unit 213 reads the public key PK and the secret key SK written in step S12 from the key storage unit 231. The output unit 213 transmits the public key PK to the encryption device 30, the homomorphic inference device 40, and the decryption device 50 via the communication interface 24. The output unit 213 transmits the secret key SK to the decryption device 50 in secrecy via the communication interface 24. To transmit in secrecy means to transmit after encryption by an existing encryption scheme. Note that the public key PK and the secret key SK may be transmitted by a different method such as by postal mail.

In the encryption device 30, the acquisition unit 311 acquires the public key PK and writes the public key PK in the public key storage unit 331. In the homomorphic inference device 40, the acquisition unit 411 acquires the public key PK and writes the public key PK in the public key storage unit 431. In the decryption device 50, the acquisition unit 511 acquires the public key PK and the secret key SK and writes the public key PK and the secret key SK in the key storage unit 531. In the decryption device 50, the secret key SK is stored strictly so as not to be leaked to the outside. The decryption device 50 functions as a storage device to store the secret key SK.

Figure 7:
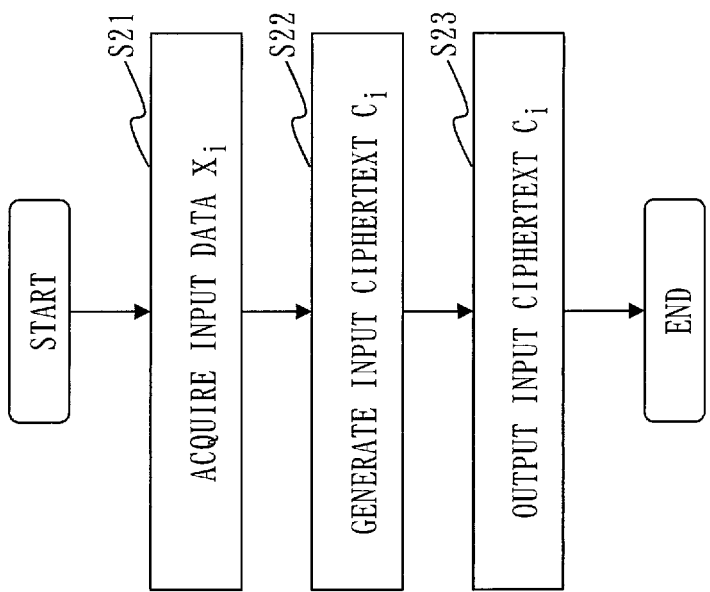
FIG. 7 is a flowchart of operation of the encryption device 30 according to the first embodiment.

Operation of the encryption device 30 according to the first embodiment will be described with reference to FIG. 7.

The operation of the encryption device 30 according to the first embodiment corresponds to an encryption method according to the first embodiment. The operation of the encryption device 30 according to the first embodiment also corresponds to processes of an encryption program according to the first embodiment.

(Step S21: Acquisition Process)

The acquisition unit 311 acquires via the communication interface 34 input data $x_i$ for i=1, . . . , n, which is data to be encrypted, where n is an integer of 1 or more. A specific example of the input data $x_i$ is data detected by a sensor installed at a factory or the like. The acquisition unit 311 writes the acquired input data in the memory 32.

(Step S22: Encryption Process)

The encryption unit 312 reads the input data $x_i$ written in step S21 from the memory 32. The encryption unit 312 also reads the public key PK from the public key storage unit 331.

The encryption unit 312 encrypts the input data $x_i$ to generate an input ciphertext $C_i$ for each integer i of i=1, . . . , n, based on the public key PK. The encryption unit 312 encrypts the input data $x_i$ by the RGSW encryption scheme here. The encryption unit 312 writes the generated input ciphertext $C_i$ in the memory 32.

(Step S23: Output Process)

The output unit 313 reads the input ciphertext $C_i$ written in step S22 from the memory 32. The output unit 313 transmits the input ciphertext $C_i$ to the homomorphic inference device 40 via the communication interface 34.

In the homomorphic inference device 40, the acquisition unit 411 acquires the input ciphertext $C_i$ and writes the input ciphertext $C_i$ in the ciphertext storage unit 432. The homomorphic inference device 40 functions as a storage device to store the input ciphertext $C_i$.

Figure 8:
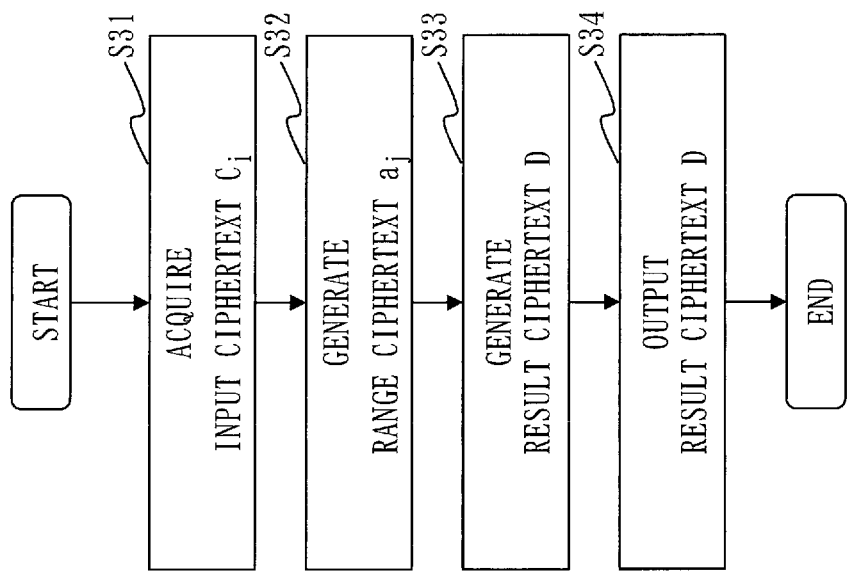
FIG. 8 is a flowchart of operation of the homomorphic inference device 40 according to the first embodiment.

Operation of the homomorphic inference device 40 according to the first embodiment will be described with reference to FIG. 8.

The operation of the homomorphic inference device 40 according to the first embodiment corresponds to a homomorphic inference method according to the first embodiment. The operation of the homomorphic inference device 40 according to the first embodiment also corresponds to processes of a homomorphic inference program according to the first embodiment.

The homomorphic inference device 40 performs inference including a non-polynomial operation, taking as input the input ciphertext $C_i$. A case in which a rectified linear unit (ReLU) function, which is one type of the activation function in neural networks, is used as the inference including a non-polynomial operation will be described here. In particular, a case in which a weight $w_i$ in a neural network is +1 or −1 will be described here. A bias in the neural network will be denoted as b.

Figure 9:
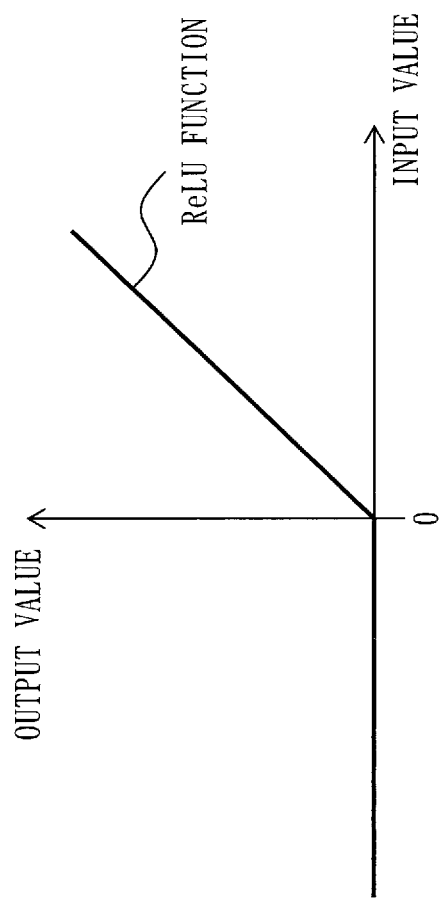
FIG. 9 is a diagram describing a ReLU function.

As illustrated in FIG. 9, the ReLU function is a function that returns an input value if the input value is greater than 0, and returns 0 if the input value is equal to or less than 0. Therefore, the ReLU function is the inference including a non-polynomial operation.

(Step S31: Acquisition Process)

The acquisition unit 411 reads the public key PK from the public key storage unit 431.

The acquisition unit 411 accepts designation of the input ciphertext $C_i$ to be processed. The acquisition unit 411 reads the input ciphertext $C_i$ to be processed from the ciphertext storage unit 432.

(Step S32: Range Determination Process)

The range determination unit 412 determines whether a value V obtained from the input data $x_i$ is within a reference range, taking as input the input ciphertext $C_i$ resulting from encrypting the input data $x_i$ for i=1, . . . , n. Then, the range determination unit 412 generates a range ciphertext $a_j$ depending on the determined result.

The value V is the value defined depending on the inference including a non-polynomial operation, and the reference range is the range depending on the inference including a non-polynomial operation. The value V and the reference range are pre-set depending on the inference to be performed. The ReLU function, which is one type of the activation function in neural networks, is used as the inference including a non-polynomial operation here. Accordingly, the value V is defined as the sum of values obtained by multiplying the input data $x_i$ by the weight $w_i$ ($\Sigma_i x_i w_i$) for each integer i of i=1, . . . , n, and the reference range is defined as the range greater than 0.

The range determination unit 412 treats the sum of values obtained by multiplying the input data $x_i$ by the weight $w_i$ ($\Sigma_i x_i w_i$) for each integer i of i=1, . . . , n as the value V, and determines whether the value V is greater than 0. Then, the range determination unit 412 generates, as the range ciphertext $a_j$, a ciphertext resulting from encrypting 1 if the value V is greater than 0, and generates, as the range ciphertext $a_j$, a ciphertext resulting from encrypting 0 if the value V is equal to or less than 0.

Figure 10:
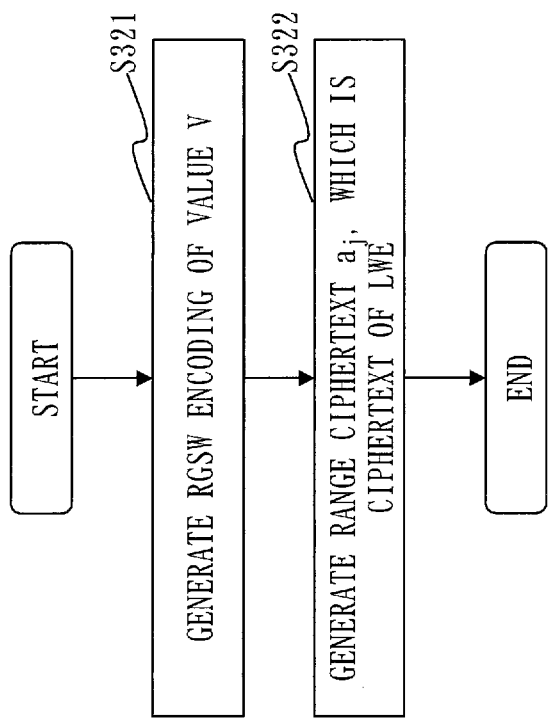
FIG. 10 is a flowchart of a range determination process according to the first embodiment.

The range determination process according to the first embodiment will be described with reference to FIG. 10.

(Step S321: RGSW Encoding Process)

The range determination unit 412 generates an RGSW encoding of ReLU(b+$\Sigma_i x_i w_i$), taking as input the bias b, the weight $w_i \in \{+1, -1\}$, and the input ciphertext $C_i$ for i=1, . . . , n.

Specifically, the range determination unit 412 first computes $A_0 := X^b \cdot G$, where X is a variable constituting a polynomial of a polynomial ring in RGSW and G is a tensor product of g and $I_2$. Note that $g := (1, 2, 2^2, \ldots, 2^{L-1})$, L is a minimum integer equal to or greater than log q, q is a positive integer, and $I_2$ is a 2×2 identity matrix.

Next, the range determination unit 412 generates a ciphertext $A_n$ by computing Formula 11 for each integer i of i:=1, . . . , n in ascending order. The range determination unit 412 writes the ciphertext $A_n$ in the memory 42.

$$A_i := \begin{cases} C_i G^{-1}(A_{i-1}) & \text{if } w_i = 1 \\ \text{SwitchKey}_{KS^{s(1/X) \to s(x)}}(C_i(1/X))G^{-1}(A_{i-1}) & \text{otherwise} \end{cases} \quad [\text{Formula 11}]$$

The SwitchKey algorithm is described in Non-Patent Literature 3. Because of s(1/x)→s(x) here, the SwitchKey algorithm is a process to convert a ciphertext that can be decrypted with s(1/x) into a ciphertext that can be decrypted with s(x). Note that s is a secret key in the RGSW encryption scheme, and $G^{-1}$ is a process to convert each integer element of a matrix into a binary representation.

The ciphertext $A_n$ generated by Formula 11 is a ciphertext resulting from encrypting $\Sigma_i x_i w_i$, which is the value V, by the RGSW encryption scheme.

(Step S322: Range Ciphertext Generation Process)

The range determination unit 412 generates the range ciphertext $a_j$ by computing Formula 12 for each integer j of j=0, . . . , L−1, taking as input the ciphertext $A_n$ computed in step S311. The range determination unit 412 writes the range ciphertext $a_j$ in the memory 42.

[Formula 12]

$$a_j = \text{SampleExtract}(A_n G^{-1}(t_j(X), 0)$$

The SampleExtract algorithm is described in Non-Patent Literature 3. The SampleExtract algorithm is a process to output a ciphertext resulting from encrypting constant terms of an input plaintext polynomial. Note that $t_j(X) := 2^j(1 - X - X^2 - \ldots)$.

The range ciphertext $a_j$ generated by Formula 12 is a ciphertext resulting from encrypting 1 if the value V is greater than 0, and is a ciphertext resulting from encrypting 0 if the value V is equal to or less than 0. Note that the range ciphertext $a_j$ computed by Formula 12 is not a ciphertext of the RGSW encryption scheme, but a ciphertext of a learning with errors (LWE) encryption scheme.

(Step S33: Result Generation Process)

The result generation unit 413 performs a homomorphic operation on the range ciphertext $a_j$ generated in step S32, so as to generate a result ciphertext D, which is a ciphertext of a result of performing the inference including a non-polynomial operation on the input data $x_i$.

That is, the result generation unit 413 generates, as the result ciphertext D, a ciphertext resulting from encrypting the value V if the value V is greater than 0, and generates, as the result ciphertext D, a ciphertext resulting from encrypting 0 if the value V is equal to or less than 0.

Figure 11:
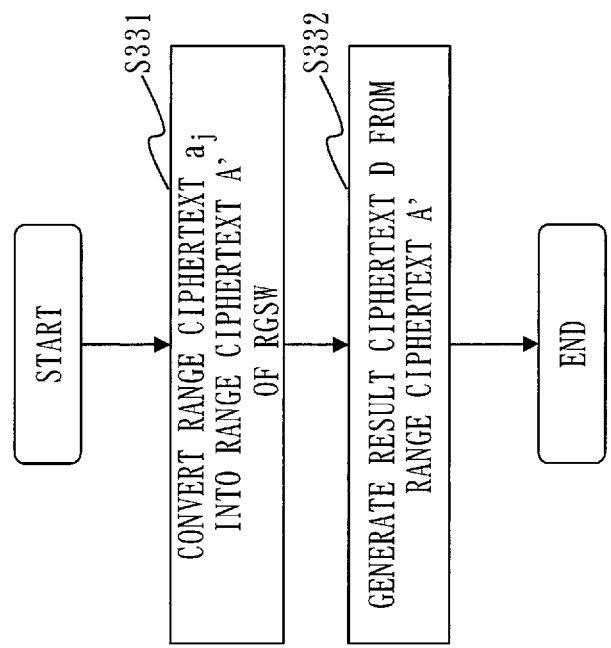
FIG. 11 is a flowchart of a result generation process according to the first embodiment.

The result generation process according to the first embodiment will be described with reference to FIG. 11.

(Step S331: Scheme Conversion Process)

The result generation unit 413 reads the range ciphertext $a_j$ written in step S322 from the memory 42. Then, the result generation unit 413 converts the range ciphertext $a_j$, which is a ciphertext of the LWE encryption scheme, into a range ciphertext A', which is a ciphertext of the RGSW encryption scheme.

Specifically, the result generation unit 413 generates the range ciphertext A' by computing Formula 13 for each integer j of j=0, ..., L−1 and each integer k of k=0, 1.

[Formula 13]

$$a'_{j,k} := \text{SwitchKey}_{KS^{s \to s}}(a_j),$$

$$A' := (a'_{j,k})_{j=0,\ldots,L-1;k=0,1} \in R_q^{2 \times 2L}$$

The SwitchKey algorithm is described in Non-Patent Literature 3. Because of s→s (italic) here, the SwitchKey algorithm is a process to convert a ciphertext that can be decrypted with s into a ciphertext that can be decrypted with s (italic).

(Step S332: Result Computation Process)

The result generation unit 413 reads the ciphertext $A_n$ of the value V written in step S321 from the memory 42. Then, the result generation unit 413 performs a homomorphic operation of computing the product of the range ciphertext A' generated in step S331 and the ciphertext $A_n$ of the value V obtained from the input data $x_i$, so as to generate the result ciphertext D.

The range ciphertext A' is the ciphertext resulting from encrypting 1 if the value V is greater than 0, and is the ciphertext resulting from encrypting 0 if the value V is equal to or less than 0. Therefore, when the product of the range ciphertext A' and the ciphertext $A_n$ is computed, the ciphertext of the value V is generated as the result ciphertext D if the value V is greater than 0, and the ciphertext resulting from encrypting 0 is generated as the result ciphertext D if the value V is equal to or less than 0.

Specifically, the result generation unit 413 generates the result ciphertext D by computing Formula 14. The result generation unit 413 writes the result ciphertext D in the memory 42.

[Formula 14]

$$D := A'G^{-1}(A_n) \in R_q^{2 \times 2L}$$

(Step S34: Output process)

The output unit 414 reads the result ciphertext D written in step S33 from the memory 42. The output unit 414 writes the result ciphertext D in the ciphertext storage unit 432.

Figure 12:
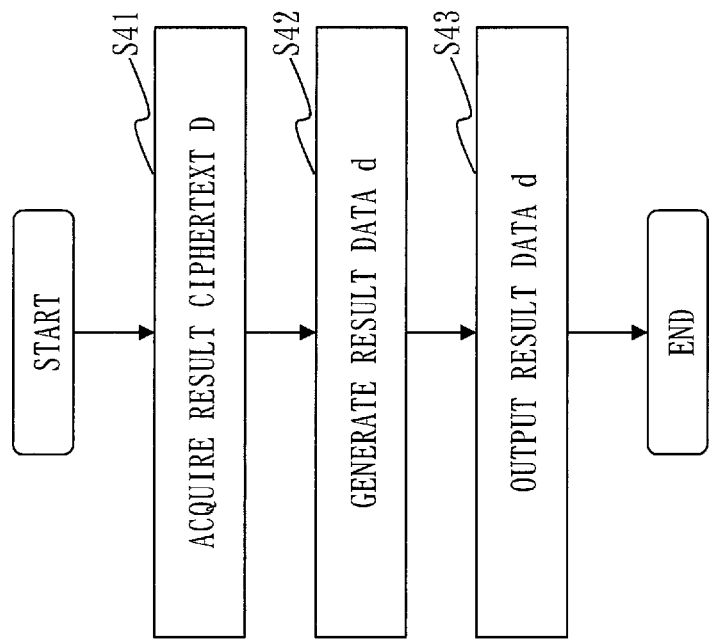
FIG. 12 is a flowchart of operation of the decryption device 50 according to the first embodiment.

Operation of the decryption device 50 according to the first embodiment will be described with reference to FIG. 12.

The operation of the decryption device 50 according to the first embodiment corresponds to a decryption method according to the first embodiment. The operation of the decryption device 50 according to the first embodiment also corresponds to processes of a decryption program according to the first embodiment.

(Step S41: Acquisition Process)

The acquisition unit 511 transmits an acquisition request for the result ciphertext D to be processed to the homomorphic inference device 40 via the communication interface 54. Then, the acquisition unit 511 acquires via the communication interface 54 the result ciphertext D requested by the acquisition request. The acquisition unit 511 writes the acquired result ciphertext D in the memory 52.

(Step S42: Decryption Process)

The decryption unit 512 decrypts the result ciphertext D acquired in step S41 to generate result data d indicating the result of performing the inference including a non-polynomial operation on the input data $x_i$. The decryption unit 512 decrypts the result ciphertext D by the RGSW encryption scheme here. The decryption unit 512 generates the result data d that is obtained when the value V obtained from the input data $x_i$ is used as the input to the ReLU function. The decryption unit 512 writes the generated result data d in the memory 52.

(Step S43: Output Process)

The output unit 513 reads the result data d written in step S42 from the memory 52. Then, the output unit 513 outputs the result data d to a display device or the like via the communication interface 54.

*Effects of First Embodiment*

As described above, in the privacy-preserving information processing system 10 according to the first embodiment, the homomorphic inference device 40 determines whether the value obtained from the input data $x_i$ is within the reference range, taking as input the input ciphertext $C_i$, and generates the range ciphertext $a_j$ depending on the determined result. Then, the homomorphic inference device 40 performs a homomorphic operation on the range ciphertext $a_j$, so as to generate the result ciphertext D of the result of performing the inference.

This allows the privacy-preserving information processing system 10 to compute the inference including a non-polynomial operation, such as a function at an intermediate layer in a neural network, with a small number of homomorphic multiplications, without performing replacement with an approximate function. Specifically, the privacy-preserving information processing system 10 can compute the inference with two homomorphic multiplications, whereas the method described in Non-Patent Literature 2 requires six homomorphic multiplications.

The privacy-preserving information processing system 10 can perform the inference in a neural network without performing replacement with an approximate function, and can thus achieve high inference accuracy. In addition, it is not necessary to configure a neural network separately for encrypted data, which leads to a reduction in cost.

In particular, the homomorphic inference device 40 generates the ciphertext resulting from encrypting 1 as the range ciphertext $a_j$ or generates the ciphertext resulting from encrypting 0 as the range ciphertext $a_j$, depending on whether the value obtained from the input data x, is within the reference range. This allows the inference including a non-polynomial operation to be computed with a small number of operations.

*Other Configurations*

<First Variation>

In the first embodiment, the ReLU function, which is one type of the activation function in neural networks, is used as the inference including a non-polynomial operation. However, the inference including a non-polynomial operation is not limited to the ReLU function.

In a first variation, a case in which a Sign function, which is one type of the activation function in neural networks, is used as the inference including a non-polynomial operation will be described. The Sign function is a function that returns the sign (+1 or −1) of an input. In the first variation, differences from the first embodiment will be described, and description of the same portions will be omitted.

The result generation process according to the first variation will be described with reference to FIG. 11.

The process of step S331 is the same as in the first embodiment.

(Step S332: Result Computation Process)

The result generation unit 413 reads the ciphertext $A_n$ of the value V written in step S321 from the memory 42. Then, the result generation unit 413 performs a homomorphic operation of computing the sum of the product of a ciphertext resulting from encrypting 1 and the range ciphertext A' and the product of a ciphertext resulting from encrypting −1 and a value obtained by subtracting the range ciphertext A' from the ciphertext resulting from encrypting 1, so as to generate a result ciphertext D.

The range ciphertext A' is the ciphertext resulting from encrypting 1 if the value V is greater than 0, and is the ciphertext resulting from encrypting 0 if the value V is equal to or less than 0. Accordingly, if the value V is greater than 0, the value obtained by subtracting the range ciphertext A' from the ciphertext resulting from encrypting 1 is 0, so that the product of the ciphertext resulting from encrypting −1 and the value obtained by subtracting the range ciphertext A' from the ciphertext resulting from encrypting 1 is 0. Therefore, the ciphertext resulting from encrypting 1, which is the product of the ciphertext resulting from encrypting 1 and the range ciphertext A', is generated as the result ciphertext D. On the other hand, if the value V is equal to or less than 0, the product of the ciphertext resulting from encrypting 1 and the range ciphertext A' is 0. The value obtained by subtracting the range ciphertext A' from the ciphertext resulting from encrypting 1 is 1. Therefore, the ciphertext resulting from encrypting −1, which is the product of the ciphertext resulting from encrypting −1 and the value obtained by subtracting the range ciphertext A' from the ciphertext resulting from encrypting 1, is generated as the result ciphertext D.

Specifically, the result generation unit 413 generates the result ciphertext D by computing Formula 15. The result generation unit 413 writes the result ciphertext D in the memory 42.

[Formula 15]

$$D:=X\cdot GG^{-1}(A')+X^{-1}GG^{-1}(G-A')\in R_q^{2\times 2L}$$

In Formula 15, XG is the ciphertext resulting from encrypting 1, and $X^{-1}G$ is the ciphertext resulting from encrypting −1.

Note that the case in which the inference including a non-polynomial operation is the Sign function is described in the first variation. However, the privacy-preserving information processing system 10 may be applicable to other types of the activation function. The privacy-preserving information processing system 10 may also be applicable to other types of the inference including a non-polynomial operation, not limited to the activation function.

<Second Variation>

In the first embodiment, the functional components are realized by software. However, as a second variation, the functional components may be realized by hardware. With respect to the second variation, differences from the first embodiment will be described.

Figure 13:
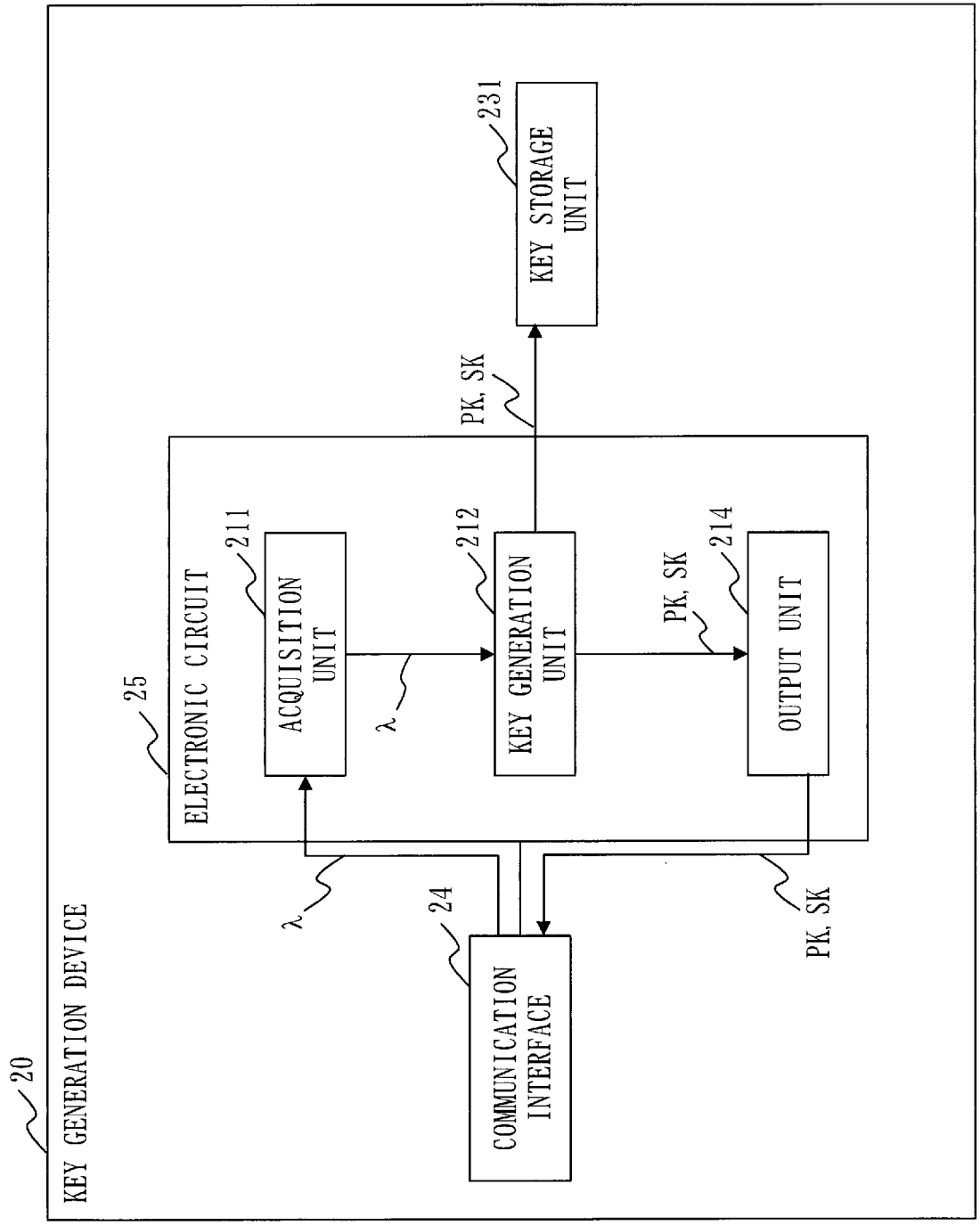
FIG. 13 is a configuration diagram of the key generation device 20 according to a second variation.

A configuration of the key generation device 20 according to the second variation will be described with reference to FIG. 13.

When the functions are realized by hardware, the key generation device 20 includes an electronic circuit 25, in place of the processor 21, the memory 22, and the storage 23. The electronic circuit 25 is a dedicated circuit that realizes the functional components of the key generation device 20 and the functions of the memory 22 and the storage 23.

Figure 14:
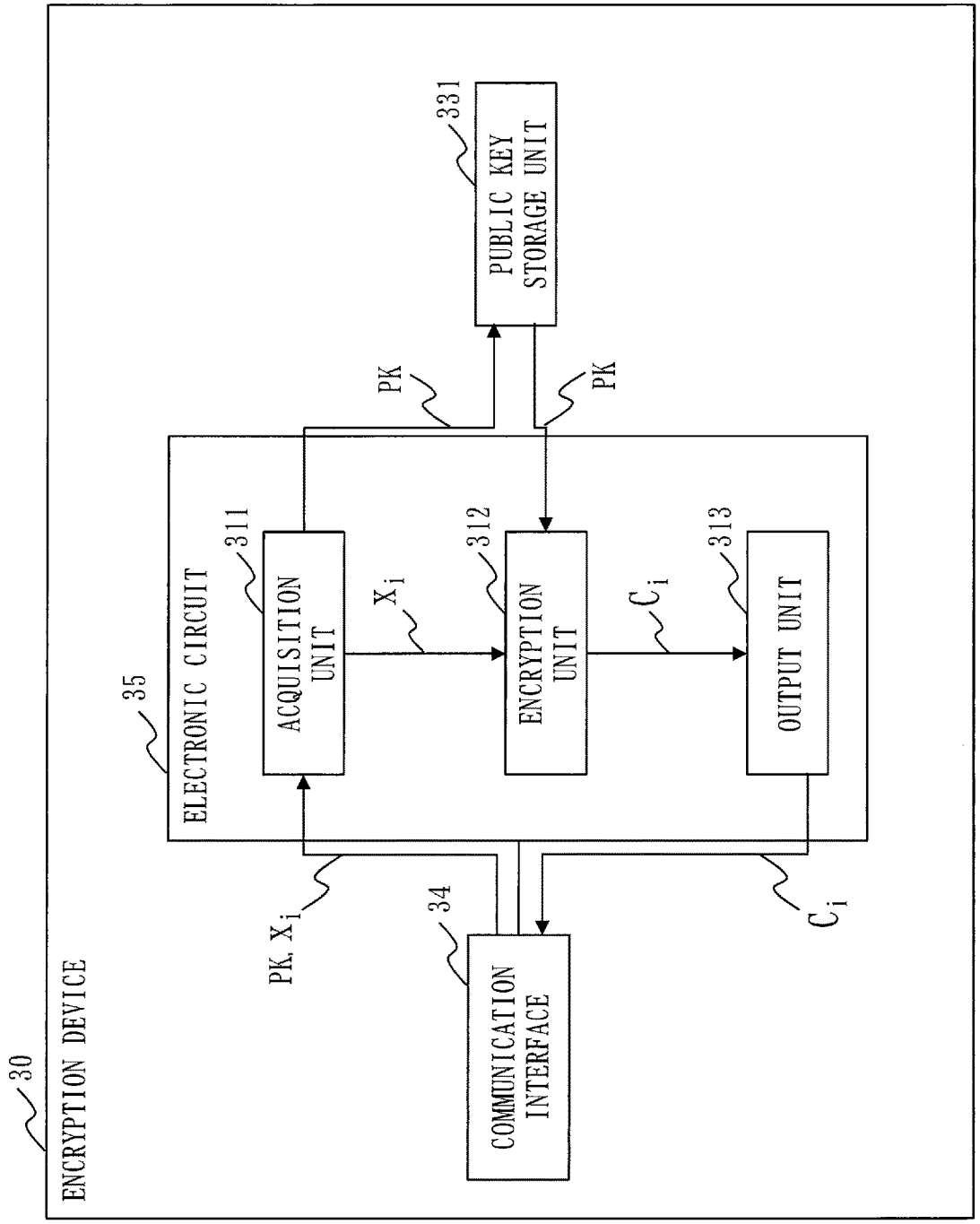
FIG. 14 is a configuration diagram of the encryption device 30 according to the second variation.

A configuration of the encryption device 30 according to the second variation will be described with reference to FIG. 14.

When the functions are realized by hardware, the encryption device 30 includes an electronic circuit 35, in place of the processor 31, the memory 32, and the storage 33. The electronic circuit 35 is a dedicated circuit that realizes the functional components of the encryption device 30 and the functions of the memory 32 and the storage 33.

Figure 15:
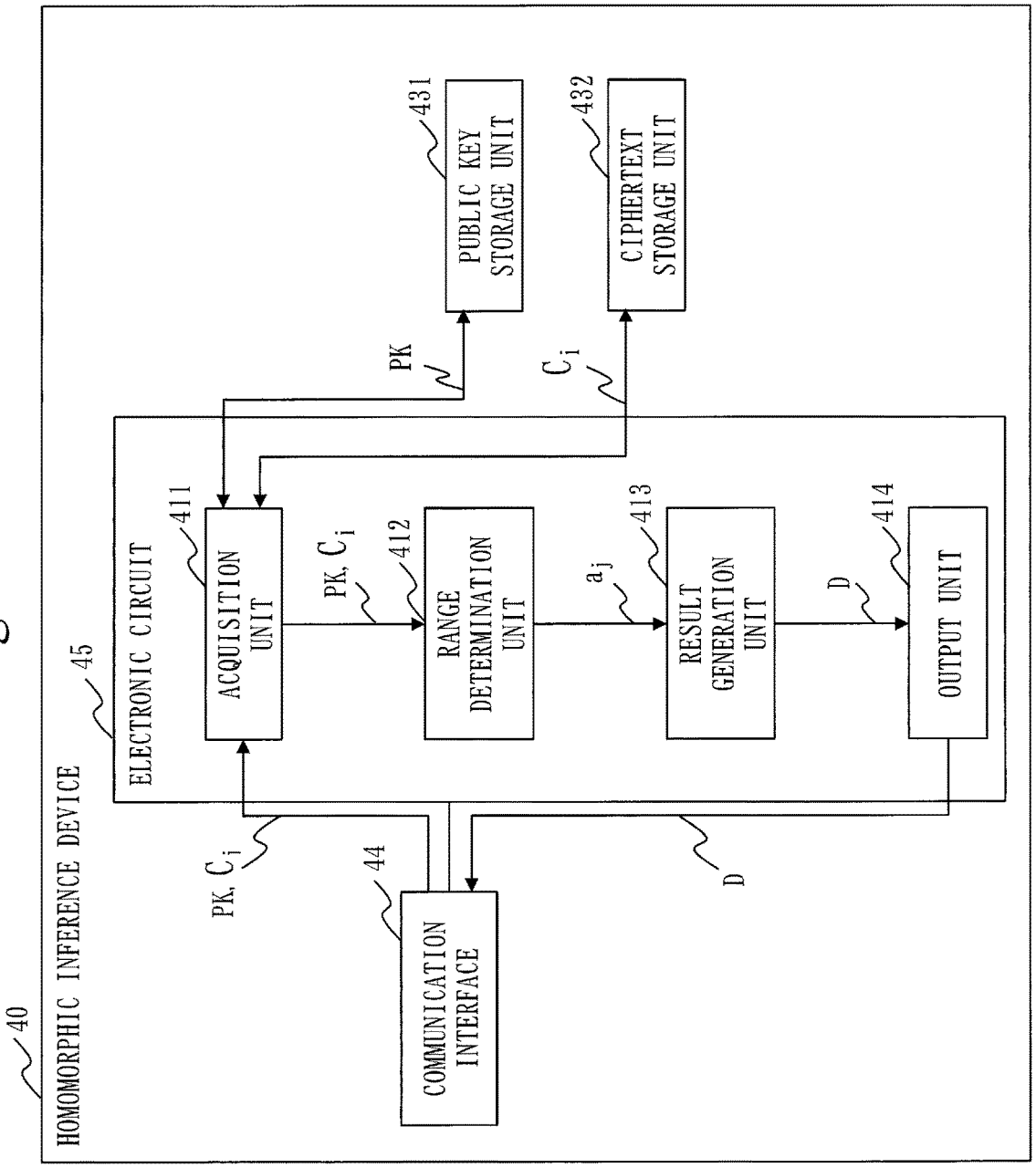
FIG. 15 is a configuration diagram of the homomorphic inference device 40 according to the second variation.

A configuration of the homomorphic inference device 40 according to the second variation will be described with reference to FIG. 15.

When the functions are realized by hardware, the homomorphic inference device 40 includes an electronic circuit 45, in place of the processor 41, the memory 42, and the storage 43. The electronic circuit 45 is a dedicated circuit that realizes the functional components of the homomorphic inference device 40 and the functions of the memory 42 and the storage 43.

Figure 16:
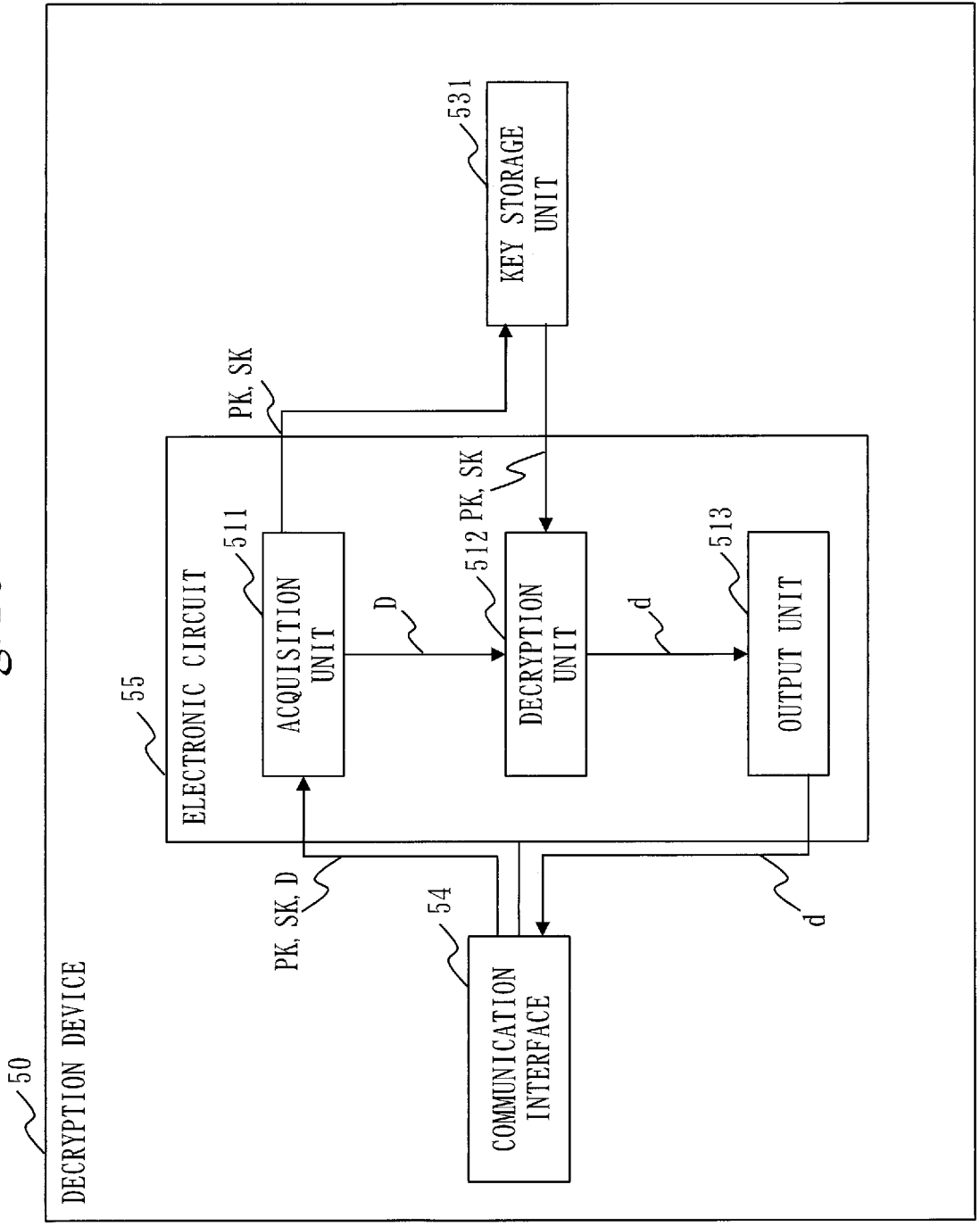
FIG. 16 is a configuration diagram of the decryption device 50 according to the second variation.

A configuration of the decryption device 50 according to the second variation will be described with reference to FIG. 16.

When the functions are realized by hardware, the decryption device 50 includes an electronic circuit 55, in place of the processor 51, the memory 52, and the storage 53. The electronic circuit 55 is a dedicated circuit that realizes the functional components of the decryption device 50 and the functions of the memory 52 and the storage 53.

Each of the electronic circuits 25, 35, 45, and 55 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the functional components of the key generation device 20 may be realized by one electronic circuit 25, or the functions of the functional components may be distributed among and realized by a plurality of electronic circuits 25. Similarly, the functions of the functional components of the encryption device 30, the homomorphic inference device 40, or the decryption device 50 may be realized by one electronic circuit 35, 45, or 55, or may be realized by a plurality of electronic circuits 35, 45, or 55, respectively.

<Third Variation>

As a third variation, some of the functions may be realized by hardware, and the rest of the functions may be realized by software. That is, some of the functions of the functional components may be realized by hardware, and the rest of the functions may be realized by software.

Each of the processors 21, 31, 41, and 51, the memories 22, 32, 42, and 52, the storages 23, 33, 43, and 53, and the electronic circuits 25, 35, 45, and 55 is referred to as processing circuitry. That is, the functions of the functional components are realized by the processing circuitry.

REFERENCE SIGNS LIST

10: privacy-preserving information processing system, 20: key generation device, 21: processor, 22: memory, 23: storage, 24: communication interface, 25: electronic circuit, 211: acquisition unit, 212: key generation unit, 213: output unit, 231: key storage unit, 30: encryption device, 31: processor, 32: memory, 33: storage, 34: communication interface, 35: electronic circuit, 311: acquisition unit, 312: encryption unit, 313: output unit, 331: public key storage unit, 40: homomorphic inference device, 41: processor, 42: memory, 43: storage, 44: communication interface, 45: electronic circuit, 411: acquisition unit, 412: range determination unit, 413: result generation unit, 414: output unit, 431: public key storage unit, 432: ciphertext storage unit, 50: decryption device, 51: processor, 52: memory, 53: storage, 54: communication interface, 55: electronic circuit, 511: acquisition unit, 512: decryption unit, 513: output unit, 531: key storage unit, 60: network

The invention claimed is:

1. A homomorphic inference device comprising:
processing circuitry executing an intermediate layer of a neural network performing recognition on an encrypted message, wherein in performing the recognition, the processing circuitry is configured to:
take as input an input ciphertext resulting from encrypting input data, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and
perform a homomorphic operation of computing a product of the generated range ciphertext and a ciphertext of the value obtained from the input data, so as to generate a result ciphertext of a result of computing a rectified linear unit (ReLU) function,
wherein the processing circuitry generates $a_j$, which is the range ciphertext, as indicated in Formula 1, and
generates D, which is the result ciphertext, as indicated in Formula 2

$$\text{for } i = 1, \ldots, n \quad \text{[Formula 1]}$$

$$A_i := \begin{cases} C_i G^{-1}(A_{i-1}) & \text{if } w_i = 1 \\ SwitchKey_{KS^{s(1/X) \to s(x)}}(C_i(1/X))G^{-1}(A_{i-1}) & \text{otherwise} \end{cases},$$

$$\text{for } j = 0, \ldots, L-1$$

$$a_j := SampleExtract(A_n G^{-1}(t_j(X), 0)$$

where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$
$G^{-1}$ is a process to convert each integer element of a matrix into a binary representation,
$g:=(1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 2]

$$\text{for } j=0, \ldots, L-1),$$

$$a'_{j,k} := SwitchKey_{KS^{s \to s}}(a_j),$$

$$A' := (a'_{j,k})_{j=0, \ldots, L-1; k=0,1},$$

$$D := A'G^{-1}(A_n)$$

where A' is the range ciphertext, and D is the result ciphertext.

2. A homomorphic inference device comprising:
processing circuitry executing an intermediate layer of a neural network performing recognition on an encrypted message, wherein in performing the recognition, the processing circuitry is configured to:
take as input an input ciphertext resulting from encrypting input data, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and
perform a homomorphic operation of computing a sum of a product of a ciphertext resulting from encrypting 1 and the range ciphertext and a product of a ciphertext resulting from encrypting −1 and a value obtained by subtracting the range ciphertext from the ciphertext resulting from encrypting 1, so as to generate a result ciphertext of a result of computing a Sign function that takes as input an integer and outputs a sign of the integer,
wherein the processing circuitry generates ai, which is the range ciphertext, as indicated in Formula 3, and
generates D, which is the result ciphertext, as indicated in Formula 4

$$\text{for } i = 1, \ldots, n \quad \text{[Formula 3]}$$

$$A_i := \begin{cases} C_i G^{-1}(A_{i-1}) & \text{if } w_i = 1 \\ SwitchKey_{KS^{s(1/X) \to s(x)}}(C_i(1/X))G^{-1}(A_{i-1}) & \text{otherwise} \end{cases},$$

$$\text{for } j = 0, \ldots, L-1$$

$$a_j := SampleExtract(A_n G^{-1}(t_j(X), 0)$$

where
n is an integer of 1 or more,
Ci is an input ciphertext resulting from encrypting input data xi,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g:=(1,2,2^2, \ldots, 2^{L-1})$,
L is a minimum integer equal to or more than log q,
g is a positive integer,
$I_2$ is a 2×2 identity matrix, and
$w_i$ is weight data in a neural network

[Formula 4]

$$\text{for } j=0, \ldots, L-1),$$

$$a'_{j,k} := SwitchKey_{KS^{s \to s}}(a_j),$$

$$A' := (a'_{j,k})_{j=0, \ldots, L-1; k=0,1},$$

$$D := X \cdot GG^{-1}(A') + X^{-1}G^{-1}GG^{-1}(A')$$

where A' is the range ciphertext, and D is the result ciphertext.

3. A homomorphic inference method, wherein the method executes an intermediate layer of a neural network performing recognition on an encrypted image, and wherein, in performing the recognition, the method comprises:

taking as input an input ciphertext resulting from encrypting input data, determining whether a value obtained from the input data is greater than 0, generating a ciphertext resulting from encrypting 1 as a range ciphertext when the value obtained from the input data is greater than 0, and generating a ciphertext resulting from encrypting 0 as the range ciphertext when the value obtained from the input data is equal to or less than 0; and performing a homomorphic operation of computing a product of the range ciphertext and a ciphertext of the value obtained from the input data, so as to generate a result ciphertext of a result of computing a rectified linear unit (ReLU) function, wherein the processing circuitry generates $a_j$, which is the range ciphertext, as indicated in Formula 1, and generates D, which is the result ciphertext, as indicated in Formula 2

$$\text{for } i = 1, \ldots, n \qquad [\text{Formula 1}]$$

$$A_i := \begin{cases} C_i G^{-1}(A_{i-1}) & \text{if } w_i = 1 \\ \text{SwitchKey}_{KS^{s(1/X) \to s(x)}}(C_i(1/X)) G^{-1}(A_{i-1}) & \text{otherwise} \end{cases},$$

$$\text{for } j = 0, \ldots, L-1$$

$$a_i := \text{SampleExtract}(A_n G^{-1}(t_j(X), 0)$$

where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g:=(1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 2]

for $j=0, \ldots, L-1$), $a'_{j,k} := \text{SwitchKey}_{KS^{s \to s}}(a_j)$, $A' := (a'_{j,k})_{j=0, \ldots, L-1; k=0,1}$, $D := A' G^{-1}(A_n)$ where A' is the range ciphertext, and D is the result ciphertext.

4. A homomorphic inference method, wherein the method executes an intermediate layer of a neural network performing recognition on an encrypted image, and wherein, in performing the recognition, the method comprises: comprising:

taking as input an input ciphertext resulting from encrypting input data, determining whether a value obtained from the input data is greater than 0, generating a ciphertext resulting from encrypting 1 as a range ciphertext when the value obtained from the input data is greater than 0, and generating a ciphertext resulting from encrypting 0 as the range ciphertext when the value obtained from the input data is equal to or less than 0; and performing a homomorphic operation of computing a sum of a product of a ciphertext resulting from encrypting 1 and the range ciphertext and a product of a ciphertext resulting from encrypting −1 and a value obtained by subtracting the range ciphertext from the ciphertext resulting from encrypting 1, so as to generate a result ciphertext of a result of computing a Sign function that takes as input an integer and outputs a sign of the integer wherein the processing circuitry generates $a_j$, which is the range ciphertext, as indicated in Formula 3, and generates D, which is the result ciphertext, as indicated in Formula 4

$$\text{for } i = 1, \ldots, n \qquad [\text{Formula 3}]$$

$$A_i := \begin{cases} C_i G^{-1}(A_{i-1}) & \text{if } w_i = 1 \\ \text{SwitchKey}_{KS^{s(1/X) \to s(x)}}(C_i(1/X)) G^{-1}(A_{i-1}) & \text{otherwise} \end{cases},$$

$$\text{for } j = 0, \ldots, L-1$$

$$a_i := \text{SampleExtract}(A_n G^{-1}(t_j(X), 0)$$

where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g:=(1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 4]

for $j=0, \ldots, L-1$), $a'_{j,k} := \text{SwitchKey}_{KS^{s \to s}}(a_j)$, $A' := (a'_{j,k})_{j=0, \ldots, L-1; k=0,1}$, $D := X \cdot GG^{-1}(A') + X^{-1} G^{-1} GG^{-1}(A')$ where A' is the range ciphertext, and D is the result ciphertext.

5. A non-transitory computer readable medium storing a homomorphic inference program for causing a computer to execute an intermediate layer of a neural network performing recognition on an encrypted message, wherein in performing the recognition, the program causes the computer to execute:

a range determination process to take as input an input ciphertext resulting from encrypting input data, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and a result generation process to perform a homomorphic operation of computing a product of the range ciphertext generated by the range determination process and a ciphertext of the value obtained from the input data, so as to generate a result ciphertext of a result of computing a rectified linear unit (ReLU) function, wherein the processing circuitry generates $a_j$, which is the range ciphertext, as indicated in Formula 1, and generates D, which is the result ciphertext, as indicated in Formula 2 for $i = 1, \ldots, n$ [Formula 1]

$$A_i := \begin{cases} C_i G^{-1}(A_{i-1}) & \text{if } w_i = 1 \\ SwitchKey_{KS^{s(1/X) \to s(x)}}(C_i(1/X))G^{-1}(A_{i-1}) & \text{otherwise} \end{cases},$$

for $j = 0, \ldots, L-1$ $a_j := SampleExtract(A_n G^{-1}(t_j(X)), 0)$ where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g := (1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 2]

for $j=0, \ldots, L-1$), $a'_{j,k} := SwitchKey_{KS^{s \to s}}(a_j)$, $A' := (a'_{j,k})_{j=0, \ldots, L-1; k=0,1}$, $D := A' G^{-1}(A_n)$ where A' is the range ciphertext, and D is the result ciphertext.

6. A non-transitory computer readable medium storing a homomorphic inference program for causing a computer to execute an intermediate layer of a neural network performing recognition on an encrypted message, wherein in performing the recognition, the program causes the computer to execute:

a range determination process to take as input an input ciphertext resulting from encrypting input data, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and a result generation process to perform a homomorphic operation of computing a sum of a product of a ciphertext resulting from encrypting 1 and the range ciphertext and a product of a ciphertext resulting from encrypting −1 and a value obtained by subtracting the range ciphertext from the ciphertext resulting from encrypting 1, so as to generate a result ciphertext of a result of computing a Sign function that takes as input an integer and outputs a sign of the integer, wherein the processing circuitry generates $a_j$, which is the range ciphertext, as indicated in Formula 3, and generates D, which is the result ciphertext, as indicated in Formula 4 for $i = 1, \ldots, n$ [Formula 3]

$$A_i := \begin{cases} C_i G^{-1}(A_{i-1}) & \text{if } w_i = 1 \\ SwitchKey_{KS^{s(1/X) \to s(x)}}(C_i(1/X))G^{-1}(A_{i-1}) & \text{otherwise} \end{cases},$$

for $j = 0, \ldots, L-1$ $a_j := SampleExtract(A_n G^{-1}(t_j(X)), 0)$ where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g := (1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 4]

for $j=0, \ldots, L-1$), $a'_{j,k} := SwitchKey_{KS^{s \to s}}(a_j)$, $A' := (a'_{j,k})_{j=0, \ldots, L-1; k=0,1}$, $D := X \cdot GG^{-1}(A') + X^{-1} G^{-1} GG^{-1}(A')$ where A' is the range ciphertext, and D is the result ciphertext.

7. A privacy-preserving information processing system comprising:

an encryption device to encrypt input data to generate an input ciphertext;

a homomorphic inference device to take as input the input ciphertext generated by the encryption device, and generate a result ciphertext of a result of computing a rectified linear unit (ReLU) function; and a decryption device to decrypt the result ciphertext generated by the homomorphic inference device, so as to generate result data indicating the result, wherein the homomorphic inference device includes processing circuitry to:

take as input the input ciphertext, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and perform a homomorphic operation of computing a product of the generated range ciphertext and a ciphertext of the value obtained from the input data, so as to generate the result ciphertext, and wherein the homomorphic operation is utilized as a function of an intermediate layer of a neural network performing recognition on an encrypted image, and wherein the processing circuitry generates $a_j$, which is the range ciphertext, as indicated in Formula 1, and generates D, which is the result ciphertext, as indicated in Formula 2

$$\text{for } i = 1, \ldots, n \quad \text{[Formula 1]}$$

$$A_i := \begin{cases} C_i G^{-1}(A_{i-1}) & \text{if } w_i = 1 \\ SwitchKey_{KS^{s(1/X) \mapsto s(x)}}(C_i(1/X))G^{-1}(A_{i-1}) & \text{otherwise} \end{cases},$$

$$\text{for } j = 0, \ldots, L-1$$

$$a_j := SampleExtract(A_n G^{-1}(t_j(X)), 0)$$

where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g:=(1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 2]

for $j=0, \ldots, L-1$), $a'_{j,k} := SwitchKey_{KS^{s \mapsto s}}(a_j)$, $A' := (a'_{j,k})_{j=0, \ldots, L-1; k=0,1}$, $D := A' G^{-1}(A_n)$ where A' is the range ciphertext, and D is the result ciphertext.

8. A privacy-preserving information processing system comprising:

an encryption device to encrypt input data to generate an input ciphertext;

a homomorphic inference device to take as input the input ciphertext generated by the encryption device, and generate a result ciphertext of a result of computing a Sign function that takes as input an integer and outputs a sign of the integer; and a decryption device to decrypt the result ciphertext generated by the homomorphic inference device, so as to generate result data indicating the result, wherein the homomorphic inference device includes processing circuitry to:

take as input the input ciphertext, determine whether a value obtained from the input data is greater than 0, generate a ciphertext resulting from encrypting 1 as a range ciphertext when the value obtained from the input data is greater than 0, and generate a ciphertext resulting from encrypting 0 as the range ciphertext when the value obtained from the input data is equal to or less than 0; and perform a homomorphic operation of computing a sum of a product of a ciphertext resulting from encrypting 1 and the range ciphertext and a product of a ciphertext resulting from encrypting −1 and a value obtained by subtracting the range ciphertext from the ciphertext resulting from encrypting 1, so as to generate the result ciphertext, and wherein the homomorphic operation is utilized as a function of an intermediate layer of a neural network performing recognition on an encrypted image, and wherein the processing circuitry generates $a_j$, which is the range ciphertext, as indicated in Formula 3, and generates D, which is the result ciphertext, as indicated in Formula 4

$$\text{for } i = 1, \ldots, n \quad \text{[Formula 3]}$$

$$A_i := \begin{cases} C_i G^{-1}(A_{i-1}) & \text{if } w_i = 1 \\ SwitchKey_{KS^{s(1/X) \mapsto s(x)}}(C_i(1/X))G^{-1}(A_{i-1}) & \text{otherwise} \end{cases},$$

$$\text{for } j = 0, \ldots, L-1$$

$$a_j := SampleExtract(A_n G^{-1}(t_j(X)), 0)$$

where
n is an integer of 1 or more,
$C_i$ is an input ciphertext resulting from encrypting input data $x_i$,
X is a variable constituting a polynomial of a polynomial ring in the ring variant of Gentry-Sahai-Waters (RGSW) encryption,
G is a tensor product of g and $I_2$,
$G^{-1}$ is a process to convert each integer element of a matrix into a binary representation,
$g:=(1, 2, 2^2, \ldots, 2^{L-1})$,
L is a minimum integer equal to or more than log q,
q is a positive integer,
$I_2$ is a 2×2 identity matrix, and
$w_i$ is weight data in a neural network

[Formula 4]

for $j=0, \ldots, L-1$), $a'_{j,k} := SwitchKey_{KS^{s \mapsto s}}(a_j)$, $A' := (a'_{j,k})_{j=0, \ldots, L-1; k=0,1}$, $D := X \cdot G G^{-1}(A') + X^{-1} G^{-1} G G^{-1}(A')$ where A' is the range ciphertext, and D is the result ciphertext.

\* \* \* \* \*